T. H. SKINNER.
SHEAVE.
APPLICATION FILED JUNE 22, 1908.
No. 905,756.
Patented Dec. 1, 1908.
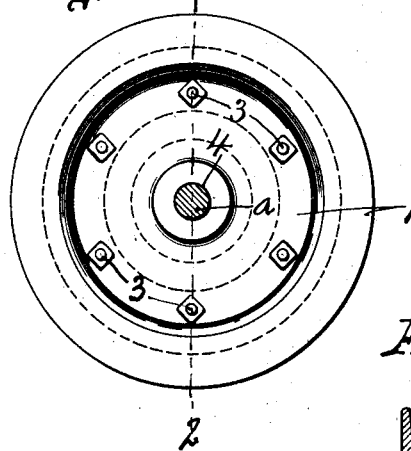
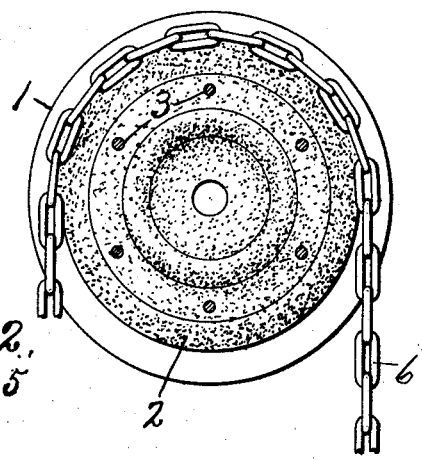
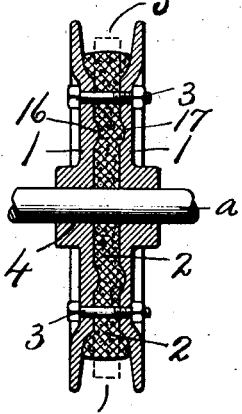
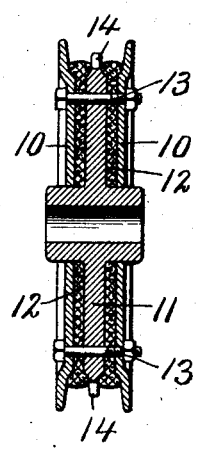
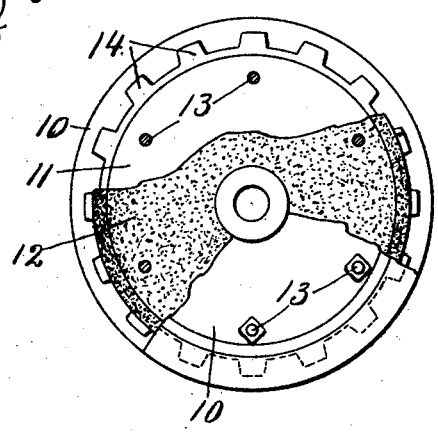
Witnesses.
Inventor.
Theodore H. Skinner
By
Howard P. Denison
Attorney.

UNITED STATES PATENT OFFICE.

THEODORE H. SKINNER, OF ONEIDA, NEW YORK, ASSIGNOR TO ONEIDA COMMUNITY, LIMITED, OF ONEIDA, NEW YORK, A CORPORATION OF NEW YORK.

SHEAVE.

No. 905,756.

Specification of Letters Patent.

Patented Dec. 1, 1908.

Application filed June 22, 1908. Serial No. 439,814.

*To all whom it may concern:*

Be it known that I, THEODORE H. SKINNER, of Oneida, in the county of Madison, in the State of New York, have invented new and useful Improvements in Sheaves, of which the following, taken in connection with the accompanying drawings, is a full, clear, and exact description.

This invention relates to certain improvements in sheaves for link belts and other chain or wire cables adapted to rest upon a sheave and involves the use of a cushion bearing of felt or other lubricant absorbent capable of yielding under the pressure of the links and of simultaneously lubricating the same as they render over or around the sheave.

My main object is to incorporate in the sheave a flexible annular bearing for the chain or similar cable whereby the links will automatically embed themselves into said bearing and thereby produce a positive drive of the sheave and at the same time to utilize the same flexible bearing as a means for lubricating the links of the chain to prevent undue wear of the contact members. In other words, I have sought to produce a chain driven sheave or pulley, which will be positively rotated by the chain without the use of the usual sprocket teeth or metal fittings for the links and at the same time to render the chain or cable self-lubricating by contact with the sheave.

Other objects and uses relating to specific parts of the sheave will be brought out in the following description.

In the drawings—Figure 1 is an end view of the sheave embodying the features of my invention. Fig. 2 is a sectional view taken on line 2—2, Fig. 1. Fig. 3 is an end view similar to Fig. 1, with one of the sides of the sheave removed showing the flexible annular bearing and a portion of a chain. Fig. 4 is a sectional view similar to Fig. 2 of a modified form of sheave and Fig. 5 is an end view of the same showing one of the end plates partly broken away.

As shown in Figs. 1, 2 and 3, this sheave preferably consists of similar opposite circular side pieces —1— of metal and an interposed flexible disk —2— of felt or other similar material capable of absorbing and retaining a lubricant as oil, said disks —1— and —2— being coaxial and clamped together by suitable fastening means as bolts —3— and are preferably provided with a central shaft opening —4— for receiving a shaft —a—. The disks —1— may be made of metal, fiber or any other material capable of withstanding the strains to which the sheave is subjected, and are of somewhat greater diameter than that of the interposed flexible disk —2— so as to form an intervening groove —5— at the periphery of the flexible disk for receiving a link belt or chain —6— and holding the latter against lateral displacement. The periphery of the flexible disk —2— forms a cushion or yielding bearing for the chain —6— and readily conforms to the shape of the links of said chain, permitting said links to embed themselves thereinto and causing a positive drive of the wheel similar to that of the sprocket wheel except that the sprocket teeth or other fixed link receiving forms are omitted. This disk —2— is preferably saturated with oil or other lubricant and affords a direct means of lubricating the links of the chain coming in contact therewith for the purpose of reducing friction and wear upon the contact members to a minimum, said disk extending from the periphery to the shaft opening —4— and serves also to lubricate the shaft or bearing for the sheave particularly when the latter is loosely mounted upon the shaft.

In Figs. 4 and 5, I have shown a sheave comprising opposite end and intermediate disks —10— and —11— of metal, fiber or any other rigid material and a pair of flexible disks —12— interposed between the intermediate disks —10—, said disks being clamped together by suitable fastening means as bolts —13—. In this instance, the intermediate disk —11— is provided on its periphery with sprocket teeth —14— for interlocking engagement with the links of the chain belt in the usual manner for sprocket wheels for greater power for driving the sheave or pulley than would be possible with the use of the chain in direct contact with the flexible bearing on the disk. In this modified form of sheave shown in Figs. 4 and 5, the peripheries of the disks —12— form yielding bearings as well as lubricators for the chain, said disks —12— being saturated with oil or other lubricant which is transmitted to the links of the chain as the latter travel around the periphery of the sheave or pulley.

The particular novelty of my invention, however, lies in providing the sheave with a yielding chain bearing containing a lubricant adapted to be transmitted to the links of the chain by contact therewith, the yielding bearing for the chain serving to permit the links of the chain to embed themselves therein for the purpose of transmitting positive motion to the sheave or pulley while the lubricant which is contained in the yielding bearing serves to lubricate the links of the chain and prevent wear thereof.

A sheave constructed in the manner described may be easily and quickly assembled at a comparatively small cost and at the same time, the yielding bearing which obviates to a considerable extent the wear on the chain may be quickly and easily replaced when worn and may be readily saturated with oil either before or after being placed in position in the sheave.

Another advantage of this cushion bearing for the chain is that it readily shapes itself to the contour of the links of the chain so that when the chain is used in connection with sheaves of less diameter there is less liability of bending or deforming the links and at the same time the depressions made by the links afford a more positive grip of the chain upon the bearing to rotate the sheave with greater power and less liability of slipping.

In order that the felt disk —2— may be held more firmly against undue radial displacement by the pressure of the link belt upon its periphery one of the disks —1— is formed with an annular rib —16— projecting from its inner face, while the other disk —1— is formed with a corresponding annular groove —17—, the rib —16— pressing the adjacent portion of the flexible disk —2— into the recess —17— to lock said disk against relative radial movement.

What I claim is:

1. A sheave for chain belts having a flexible annular bearing for the chain and containing a lubricant adapted to be transmitted to the links of said chain by contact with said bearing.

2. A sheave comprising a lubricant containing a disk of yielding material forming an annular belt bearing.

3. A sheave composed of opposite end disks of rigid material, and an interposed disk of flexible material, said flexible disk containing a lubricant.

4. A sheave having a central shaft opening and composed of rigid end disks, and an interposed flexible disk having its periphery exposed for contact with the belt, and its inner face exposed to the shaft opening for the purpose described.

In witness whereof I have hereunto set my hand this 5th day of June 1908.

THEODORE H. SKINNER.

Witnesses:
  H. E. CHASE,
  CAROLINE MCCORMACK.